Aug. 13, 1963  W. A. BAKER ETAL  3,100,458
MOLDED RAILWAY VEHICLE BODIES
Filed Dec. 29, 1958  6 Sheets-Sheet 1
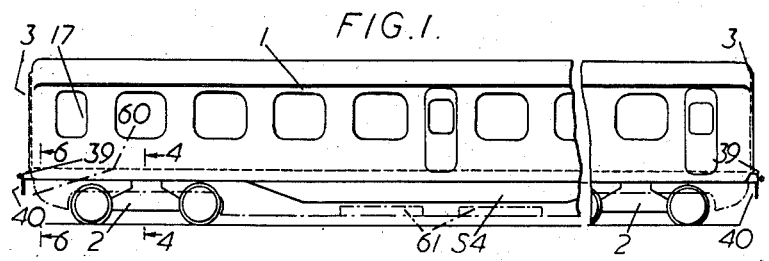
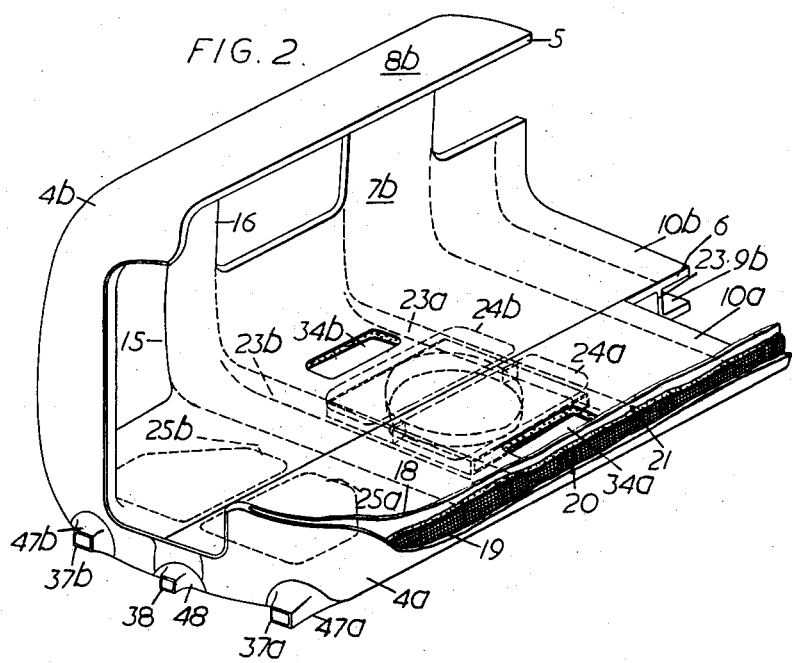
Inventors
William Andrew Baker
Alan William Thompson
Francis Murray Lane
Jack Poslett
By
Bailey, Stephens & Huett
Attorneys

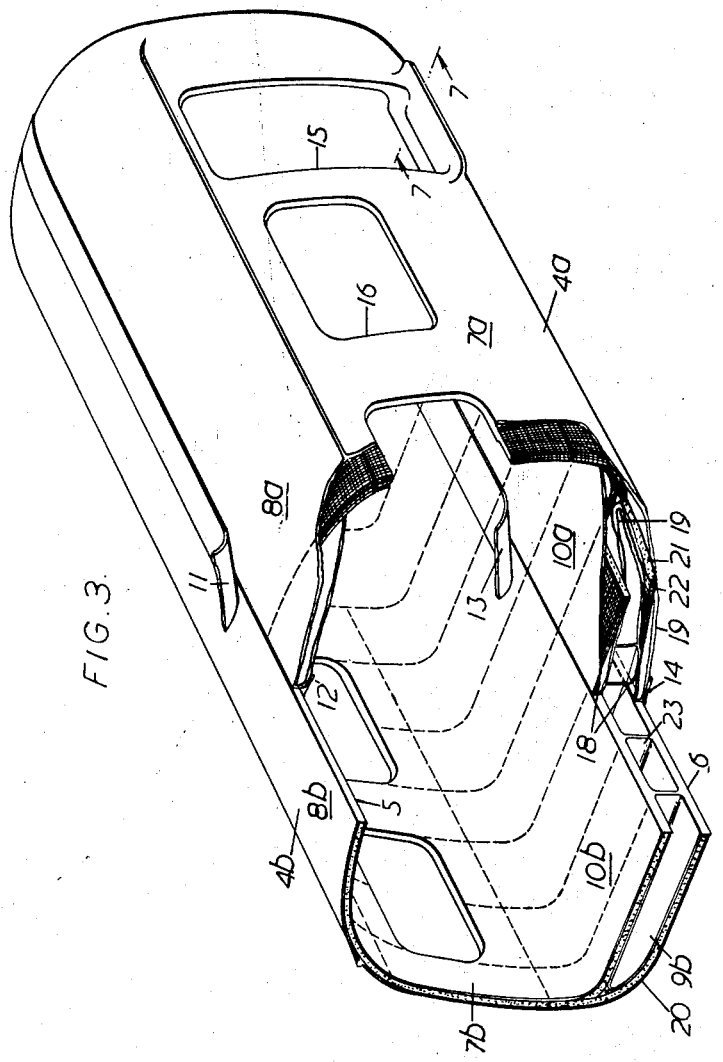

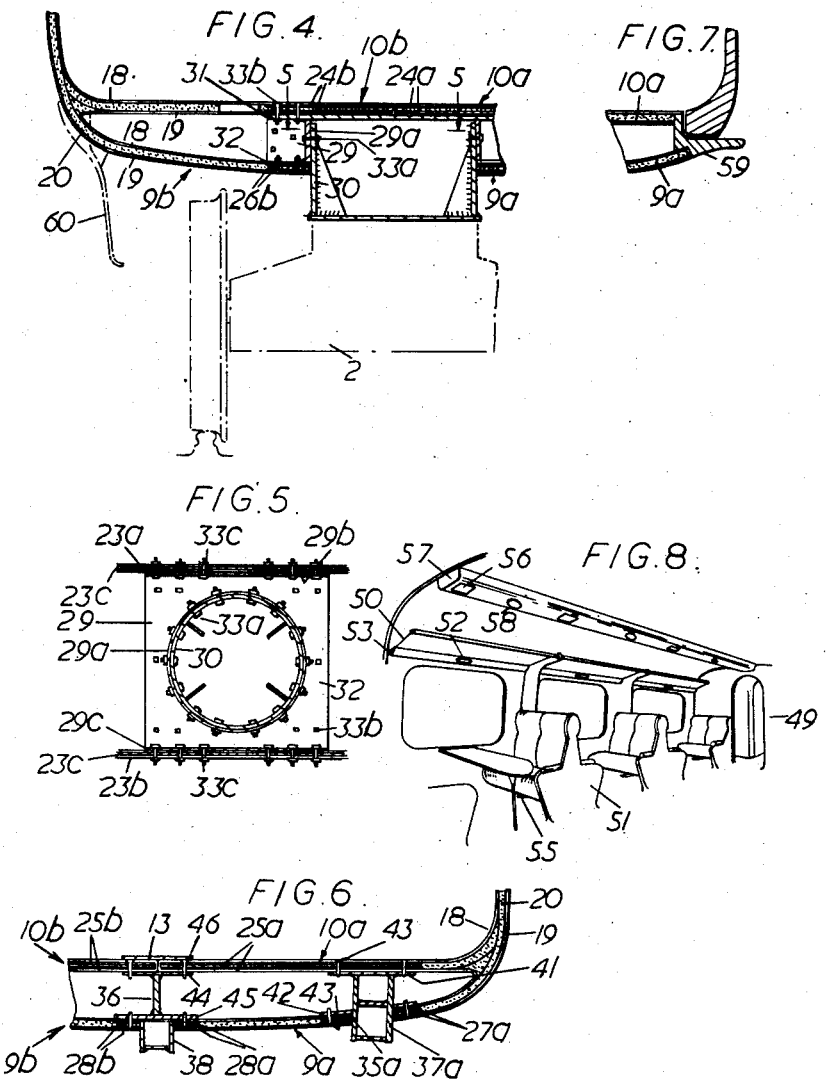

Inventors
William Andrew Baker
Alan William Thompson
Francis Murray Lane
Jack Poslett
By
Bailey, Stephens & Huetty
Attorneys Aug. 13, 1963 W. A. BAKER ETAL 3,100,458
MOLDED RAILWAY VEHICLE BODIES
Filed Dec. 29, 1958 6 Sheets-Sheet 5
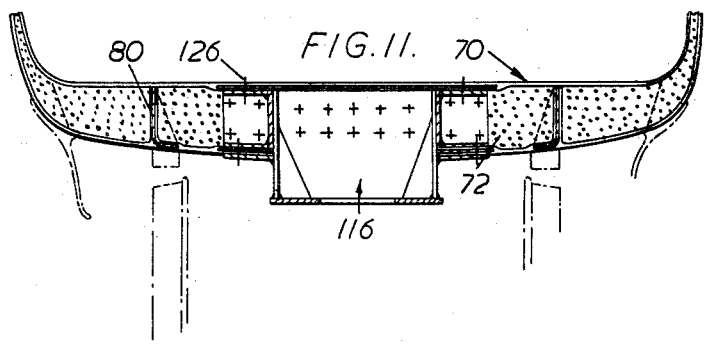
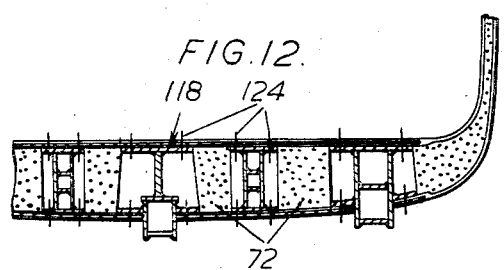
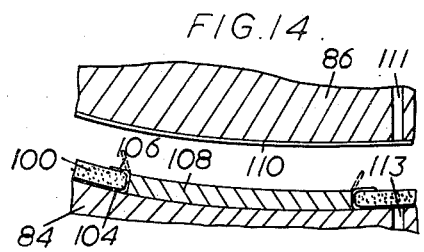
Inventors
William Andrew Baker
Alan William Thompson
Francis Murray Lane
Jack Posselt
By
Bailey, Stephens & Huettig
Attorneys

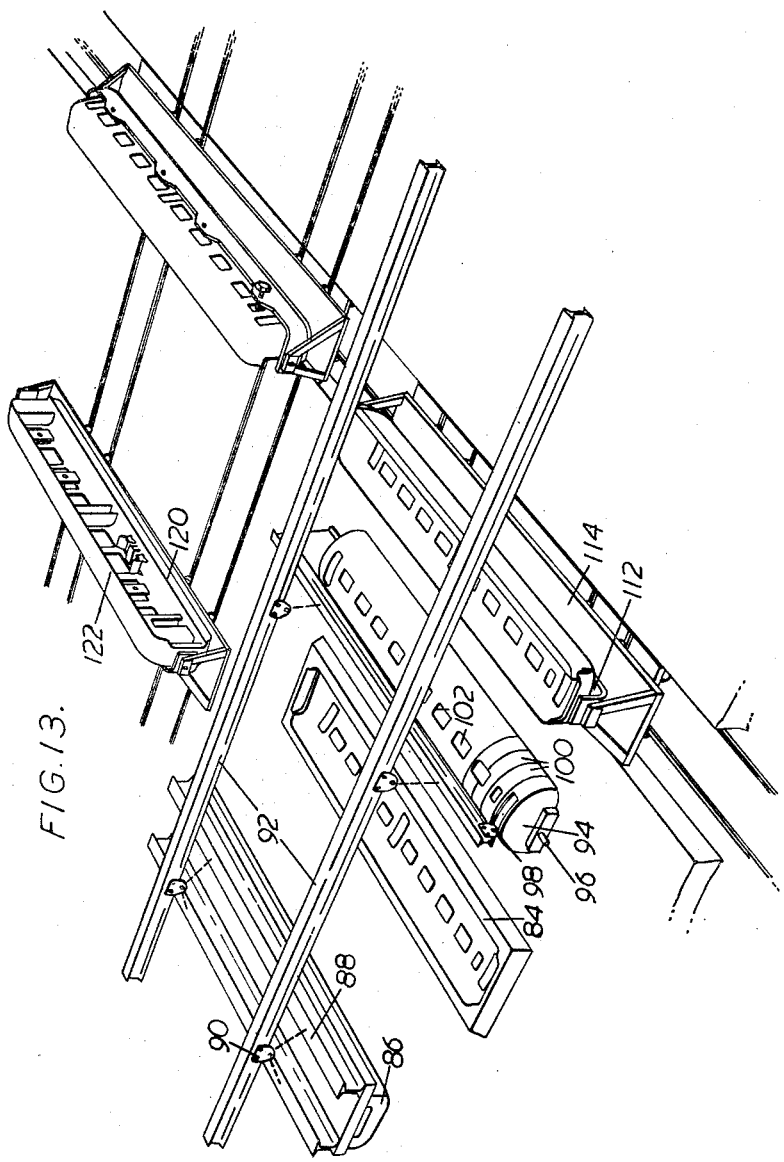

United States Patent Office 3,100,458
Patented Aug. 13, 1963

3,100,458
MOLDED RAILWAY VEHICLE BODIES
William Andrew Baker, Alan William Thompson, Francis Murray Lane, and Jack Poslett, Bristol, England, assignors, by mesne assignments, to Bristol Aeroplane Plastics Limited, Bristol, England
Filed Dec. 29, 1958, Ser. No. 783,346
Claims priority, application Great Britain Jan. 3, 1958
4 Claims. (Cl. 105—397)

This invention relates to the construction and manufacture of wheeled vehicle bodies mainly from mouldable plastic materials.

According to the invention the shell of a wheeled vehicle body is composed of two trough-shaped mouldings constituting parts of the shell on opposite sides of a longitudinal plane, each moulding comprising inner and outer skins of resin-bonded fibrous material connected by rigid cell-forming membranes. In this way production in quantity may be facilitated.

The cell-forming membranes may be of different material from the skins. For example, in a preferred form of construction the skins are separated by a layer of rigid multicellular material, and the large numbers of walls between the cells of the multicellular material constitute the membranes. Alternatively the membranes may be of the same material as the skins. For example the skins may be connected by webs of resin-bonded fibrous material which may be additional to or instead of the multicellular material.

In the preferred construction, by suitable selection of the multicellular material low weight may be obtained in combination with good heat insulation and sound absorbtion properties, while the fibrous skins ensure toughness and resistance to impact and fatigue effects.

Advantageously a colouring pigment and/or other material providing a decorative effect is incorporated in or as a surface layer of the inner and/or outer skins to provide a permanent decorative effect requiring for its maintenance only cleaning and possibly occasional polishing.

The invention is notably applicable to railway vehicles, especially passenger coaches and also thermally insulated vans. Preferably the mouldings constitute halves of the shell on opposite sides of a vertical longitudinal plane. The two halves may be identical in general shape, and any necessary differences in window and door openings may be obtained without the need for two different moulds. The mouldings for a van may be similar to those for a coach save for fewer openings. The cellular interior of the mouldings provides thermal insulation.

Preferably a shell part is made by laying outer skin material and multicellular material into a female mould part with its opening facing upwardly, attaching inner skin material on to a male mould part, lowering the male mould part into the female mould part, impregnating the skin material with resin in free-flowing liquid state, solidifying the resin, raising the male mould and shell part and lowering them onto a support, releasing the shell part from the male mould, and removing the male part.

Apparatus for carrying out this method may consist essentially of a stationary female mould part, a male mould part with lifting attachments, means for raising and transporting the male part by the lifting attachments, a support on which a shell half can be laid, and means for admitting resin to the bottoms of the male and female parts.

The accompanying drawings show examples of railway coaches according to the present invention. In these drawings:

FIGURE 1 is an outline side view of the complete coach;

FIGURE 2 is a partially sectioned perspective view of one end of the shell of the coach body;

FIGURE 3 is a similar view, from the same direction, of the other end of the shell;

FIGURE 4 is a cross section through part of the bottom of the coach in way of the bogie mounting frame, that is to say in the plane indicated by the line 4—4 in FIGURE 1;

FIGURE 5 is a section through the bogie mounting frame on the line 5—5 in FIGURE 4;

FIGURE 6 is a cross section through part of the bottom of the coach in way of the drawbar and buffer frames, corresponding to the line 6—6 in FIGURE 1;

FIGURE 7 is a section on the line 7—7 in FIGURE 3 showing the arrangement of footboards;

FIGURE 8 illustrates the arrangement of seats and other internal fittings in the coach body;

FIGURES 11 and 12 are fragmentary cross sections similar to FIGURES 4 and 6 but of the second coach body;

FIGURE 13 is a diagrammatic perspective view of apparatus for making coach bodies; and FIGURE 14 is a fragmentary section through a male and female mould just before being brought together.

Figure 9:
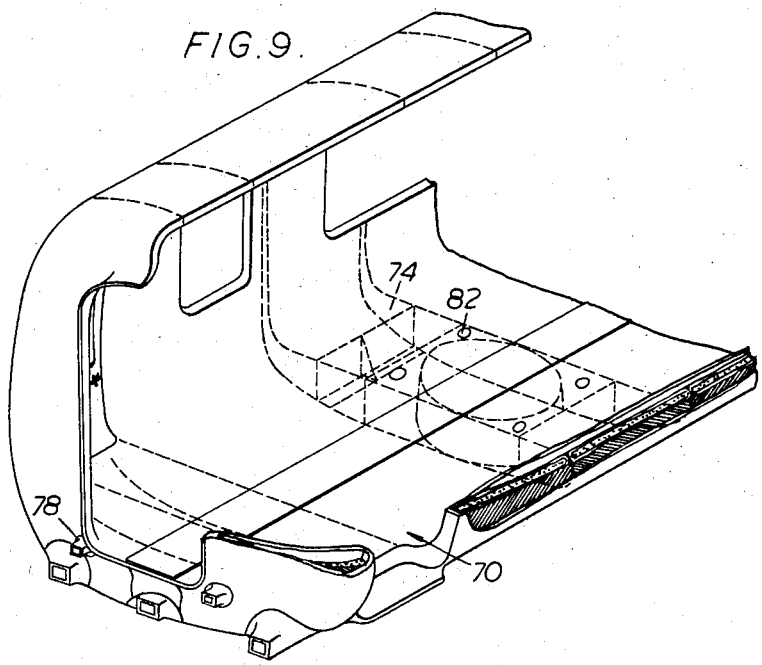
FIGURE 9 is a partially sectioned perspective view of one end of a second coach body.

The coach shown in FIGURES 1 to 8 is of the kind comprising a body 1 mounted upon two bogies 2 and having a corridor door 3 at each end. The construction of the bogies 2 forms no part of the present invention and will not be further described. The shell of the body, by which is meant the hollow structure devoid of window and door frames, internal partitions and other fittings, is composed of two mouldings 4a and 4b, see FIGURES 2 and 3, constituting halves of the shell on opposite sides of a vertical longitudinal plane identifiable in FIGURES 2 and 3 as the plane containing an upper joint 5 and a lower joint 6. As originally moulded both mouldings are identical and each comprises a side wall panel 7a, 7b merging into a roof panel 8a, 8b and into a bottom panel 9a, 9b and also a floor panel 10a, 10b spaced from the bottom panel. The two mouldings 4a and 4b are adhesively joined together at the joints 5 and 6 and each joint is further reinforced by a pair of adhesively attached butt-straps respectively inside and outside the shell. Part of the outer butt-strap of the upper joint 5 is shown at 11 in FIGURE 3 and part of the inner one at 12. Similarly, part of the inner butt-strap of the lower joint 6 is shown at 13 and part of the outer one at 14. After the mouldings have been made, and preferably before they are joined together to form the complete shell, door and window openings 15 and 16 are cut in their side panels 7a and 7b. The arrangement of these openings may be different for the two mouldings, although in the coach illustrated they are in fact identical, the turning of one moulding to bring it into proper juxtaposition with the other producing an asymmetrical arrangement relatively to the vertical longitudinal plane in which at one end of the coach there is a door opening 15 on the left hand side and a lavatory compartment window-opening 17 on the right hand side, and at the other end of the coach the positions are reversed. The openings may be provided with frames and doors or glazing of any suitable design.

The panels of which the mouldings are composed comprise inner skins 18 and outer skins 19 of fibrous material bonded with a resin which has been set to a solid state by polymerisation and is sufficiently stable in that state through the range of temperatures which will be encountered in use. Preferably either a polyester or an epoxide resin is used for this purpose. The fibrous material incorporated in the inner and outer skins is preferably glass fibre in woven form, several thicknesses being used for each skin, but if desired a material having superior qualities in regard to decorative effect or durability may be used as a surface layer. For example the surface layer or selected parts of it may be composed of cloth woven from polyamide fibres, or of a solid film of a melamine or other hard wear-resistant resinous material. The surface layer may alternatively or additionally be coloured by the incorporation of suitable pigments or dyes in the fibrous material or in the bonding resin or in both. The inner and outer skins are separated by a layer 20 of rigid multicellular material which may be for example of foamed plastic material which has been set to a hard rigid state or a foamed cellulosic material having these properties. The material should also be combustion resistant or be treated with known fire-proofing agents to make it so. The layer 20 is preferably built up from moulded blocks 21 of the multicellular material, these blocks being wrapped before assembly in sheet fibrous material 22 which is either already impregnated with bonding resin or becomes so impregnated at a later stage in the process, for example as presently described. In the finished moulding the blocks of multicellular material are thus enclosed in cells the walls of which are composed of resin-bonded fibrous material. As will be seen from FIGURES 2 and 3 the bottom panels 9a, 9b and the floor panels 10a, 10b of the respective mouldings are interconnected by webs 23. These webs are formed from resin-bonded fibrous material continuous with the outer skin of the floor panel and the inner skin of the bottom panel.

The mouldings also comprise thin steel reinforcement plates 24a, 24b and 25a, 25b incorporated in the inner and outer skins of the floor panel 10a, 10b at each end of the moulding, and somewhat similar plates 26a, 26b, 27a, 27b, and 28a, 28b are also incorporated in the inner and outer skins of the bottom panel 9a, 9b. The plates 24a, 24b and 26a, 26b reinforce the floor and bottom panels in the region at each end of the moulding where, as shown in FIGURES 4 and 5, a steel frame 29 is lodged between these panels, bridging the joint between the two mouldings. The frame 29 includes a tubular part 29a into which a tubular part 30 arranged for connection to a bogie 2 projects upwardly through the bottom panel and is secured by bolts 33a. The frame 29 is provided with top and bottom plates 31 and 32 which engage respectively the underside of the floor panel 10a, 10b and the upper side of the bottom panel 9a, 9b, bolts 33b being used to secure these parts together. The frame 29 is also provided with end plates 29b and 29c which are secured by bolts 33c to two of the webs 23a and 23b, these webs being reinforced by steel plates 23c extending right across the bottom of each moulding. To provide access for tightening these bolts, openings 34a, 34b are cut in the floor panels 10a, 10b. These openings are eventually closed by covers (not shown).

The plates 25a, 25b; 27a, 27b and 28a, 28b reinforce the floor and bottom panels in the region at each end of the moulding where, as shown in FIGURE 6, steel frames 35a, 35b and 36 are lodged between these panels and have parts 37a, 37b and 38 respectively projecting through the ends of the body and arranged to receive buffers 39 and drawbar equipment 40. The frames 35a, 35b are provided with flange plates 41, 42 which engage respectively the underside of the floor panel 10a, 10b and the upper side of the bottom panel 9a, 9b, where these are reinforced by the plates 25a, 25b and 27a, 27b, and bolts 43 secure all these parts together. In a somewhat similar manner the frames 36 are provided with flange plates 44 and 45 and are secured by bolts 46. The parts of the frames 35a, 35b and 36 which project through the mouldings are covered and faired into the surface of the latter by cowlings 47a, 47b and 48 built up from resin-bonded fibrous material.

The side panels 7a and 7b may also be reinforced by moulded-in metal plates in cases where the extent of the required window and door openings is such as to weaken the structure inadmissably.

The principal internal fittings are illustrated in FIGURE 8 and comprise partitions 49, luggage racks 50 and seat frames 51. All these parts are made from resin-bonded fibrous material and are attached by an adhesive to the shell mouldings. The luggage racks may incorporate electric light fittings 52 and a channel 53 for the electrical wiring. The partitions constituting the lavatory compartments may be preassembled as complete units together with the wash basins and other fittings required in these compartments, the units being afterwards secured in place in the shell mouldings by means of an adhesive. Ventilation may be effected by means of opening windows, or alternatively air-conditioning equipment may be carried, together with other services, in a housing 54 slung beneath the body. In this case the windows are not openable and air may be distributed to the interior of the coach through grilles 56 in a duct 57 running along the inside of the roof panel, the spent air being exhausted through grilles 55 in the floor panel into light plastic ducting installed in the space between the floor and bottom panels. Alternatively, flow in the reverse direction may be used. The duct 57 may also carry further electric light fittings 58. If desired, the underside of the coach body may be closed in, except in way of the bogies 2, by a moulded plastic fairing 60, removable access panels 61 being provided where necessary for servicing the equipment in the housing 54.

As will be seen from FIGURES 3 and 7 the formation of the door openings involves the insertion and attachment by means of an adhesive of a pre-moulded block 59 constituting a door sill and footboard.

Figure 10:
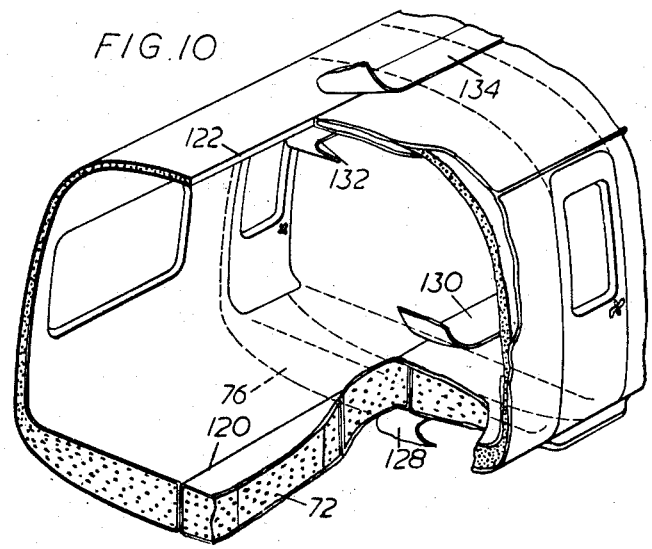
FIGURE 10 is a similar view of the central portion of the second coach body.

The coach shown in FIGURES 9 to 12 differs from that shown in FIGURES 1 to 8 in two principal ways. Firstly the floor and bottom panels are not separate and instead there is only a bottom panel 70 in which the multicellular layer 72 is thicker than elsewhere. Secondly the blocks of multicellular material are not individually wrapped in fibrous material, but are secured together by adhesive, except in way of the bogie mountings and door openings where fibrous material is placed between the blocks to form webs 74 and 76.

There are also slight differences in the metal reinforcement. There are additional boxes 78 at the ends of the bottom to receive sliding rods to support a concertina vestibule. There are intercostal diaphragms 80 between the bogie mounting frames to distribute loads from roll-limiting abutment blocks which will cooperate with blocks on the bogie. Access to the bogie pivot mounting base is by means of four small trap doors 82.

Instead of being cut out after moulding, the window and door openings are formed in the multicellular material before moulding. This will be made clearer by reference to FIGURES 13 and 14 which show the apparatus by which the body shown in FIGURES 9 to 12 is made.

The female mould 84 is a fixture, placed with its open side upwards, and the male mould 86 is movable, being provided with lifting attachments 88 connected to hoists 90 on a gantry 92. There is also a form tool 94 of similar contour to the male mould, but of lighter construction. This has trunnions 96 by which it is connected to further hoists 98 on the gantry 92.

The blocks 100 of multicellular material are placed on the form tool 94, stuck together and are then covered by the outer skin of unimpregnated fibrous material. Then the form tool is inverted, traversed over the female mould and lowered into it, and the outer skin and blocks are left in the female mould, as shown in FIGURE 14, the form tool being then raised and removed. The inner skin of unimpregnated fibrous material is placed over the male mould.

Openings 102 are moulded or cut in the blocks 100 before assembly. When the blocks are in the female mould, the outer skin 104 is cut and folded back at 106 around the edges of the openings. A filler piece 108 of slightly compressible material is placed in the opening, and then the male mould is traversed and lowered onto the female mould. The inner skin 110 is not cut away from the opening until after the moulding process, as this sequence enables the skin to be evenly stretched over the male mould.

Impregnating resin in a free flowing liquid state is then admitted through a number of spaced openings 111 and 113 in the lowest parts of the moulding surfaces of the female and male moulds until all the fibrous material of the assembly has been impregnated with the resin. The resin is then allowed or caused to set by polymerisation, for example by heating one or both parts of the mould.

When the resin has fully set the male mould is again raised by means of the lifting gear, carrying the moulding with it, is traversed and lowered into a carrier 112 mounted on trunnions on an assembly trolley 114. The attachment of the skin-forming fibrous material to the male mould is then released and the mould and filler pieces extracted. The carrier is then turned on its trunnions to bring the roof panel uppermost. While on the assembly trolley, fittings such as doors and windows, internal partitions, luggage racks and seats are installed so as to complete the half body as far as practical. When this work has been finished, two half bodies, each on an assembly trolley, are brought together, with the bogie frames 116 and the drawbar frames 118 (see FIGURES 11 and 12) in their proper positions between them, and the necessary connections are made by means of an adhesive at the joint faces 120 and 122 and of the bolts 124 and 126 and the butt-straps 128, 130, 132 and 134. Finally, loose furnishings such as carpeting and seat upholstery, which are readily removable for cleaning or replacement, are fitted and the completed body is mounted upon bogies and is ready for use.

If the two sides of the coach are not identical then they may be moulded each with a different filler piece arrangement.

We claim:
1. A chassisless railway vehicle comprising a shell, two bogies near opposite ends of the said shell, and means for applying force to the shell near each end, the said shell being composed of two trough-shaped mouldings constituting the parts of the said shell lying on opposite sides of a longitudinal plane and joined to one another along both pairs of adjacent longitudinal edges at the said longitudinal plane, each of the said two mouldings comprising inner and outer skins of resin-bonded fibrous material connected by rigid cell-forming membranes, the said mouldings having separate metal reinforcement embedded in them near the ends of the shell, the vehicle having fastenings near each end passing through the said metal reinforcement and securing to the shell the means for applying force to the shell.

2. In a railway vehicle according to claim 1, buffing gear and drawgear near each end of the said shell, and fastenings connected to said buffing gear and drawgear passing through the sai dembedded reinforcement.

3. In a railway vehicle according to claim 1, said bogies being attached to the said shell by fastenings passing through the said embedded reinforcement and connected to said shell attaching said bogies to said shell.

4. A chassisless railway vehicle comprising two longitudinally spaced bogies, a shell mounted directly on said bogies, and buffing gear and drawgear near each end of said shell, said shell being composed of two trough-shaped mouldings constituting the parts of said shell lying on opposite sides of a vertical central longitudinal plane and joined to one another at the longitudinal plane along the top and bottom pairs of adjacent edges, each of the said two mouldings comprising inner and outer skins of resin-bonded fibrous material, rigid cell-forming members, connecting said inner and outer skins, the said shell having separate embedded metal reinforcements near each end, fastenings passing through said reinforcements to secure the shell to the said two bogies, and fastenings to secure the said buffing gear and drawgear to the shell.

References Cited in the file of this patent
UNITED STATES PATENTS

| | | |
|---|---|---|
| 2,197,950 | Schwenk | Apr. 23, 1940 |
| 2,242,269 | Siebler | May 20, 1941 |
| 2,356,008 | Schafer | Aug. 15, 1944 |
| 2,438,185 | Prance | Mar. 23, 1948 |
| 2,723,154 | Barenyi | Nov. 8, 1955 |
| 2,744,042 | Pace | May 1, 1956 |
| 2,814,524 | Porsche et al. | Nov. 26, 1957 |
| 2,883,233 | Beckley | Apr. 21, 1959 |
| 2,907,284 | Folmsbee | Oct. 6, 1959 |
| 2,962,323 | McBride | Nov. 29, 1960 |